Nov. 4, 1958   L. P. GARVEY ET AL   2,858,878
SEAT ADJUSTING MECHANISM
Original Filed Feb. 27, 1956   3 Sheets-Sheet 3
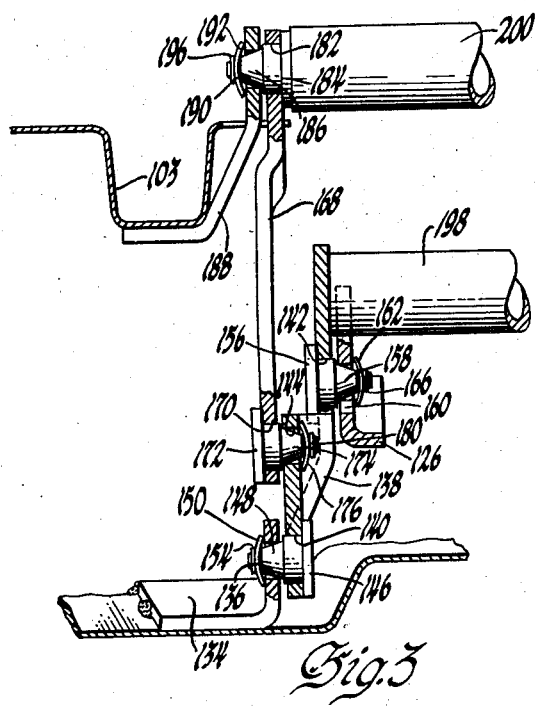
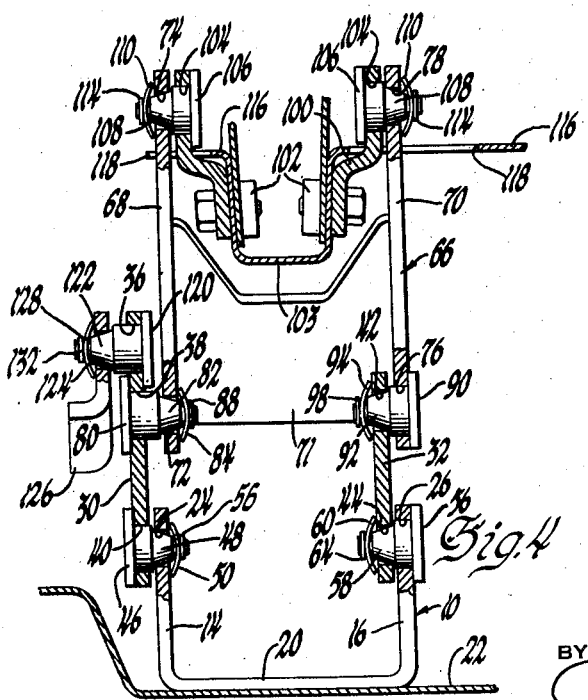
INVENTORS
Claud S. Semar, &
Louis P. Garvey
BY Paul Fitzpatrick
ATTORNEY United States Patent Office 2,858,878
Patented Nov. 4, 1958

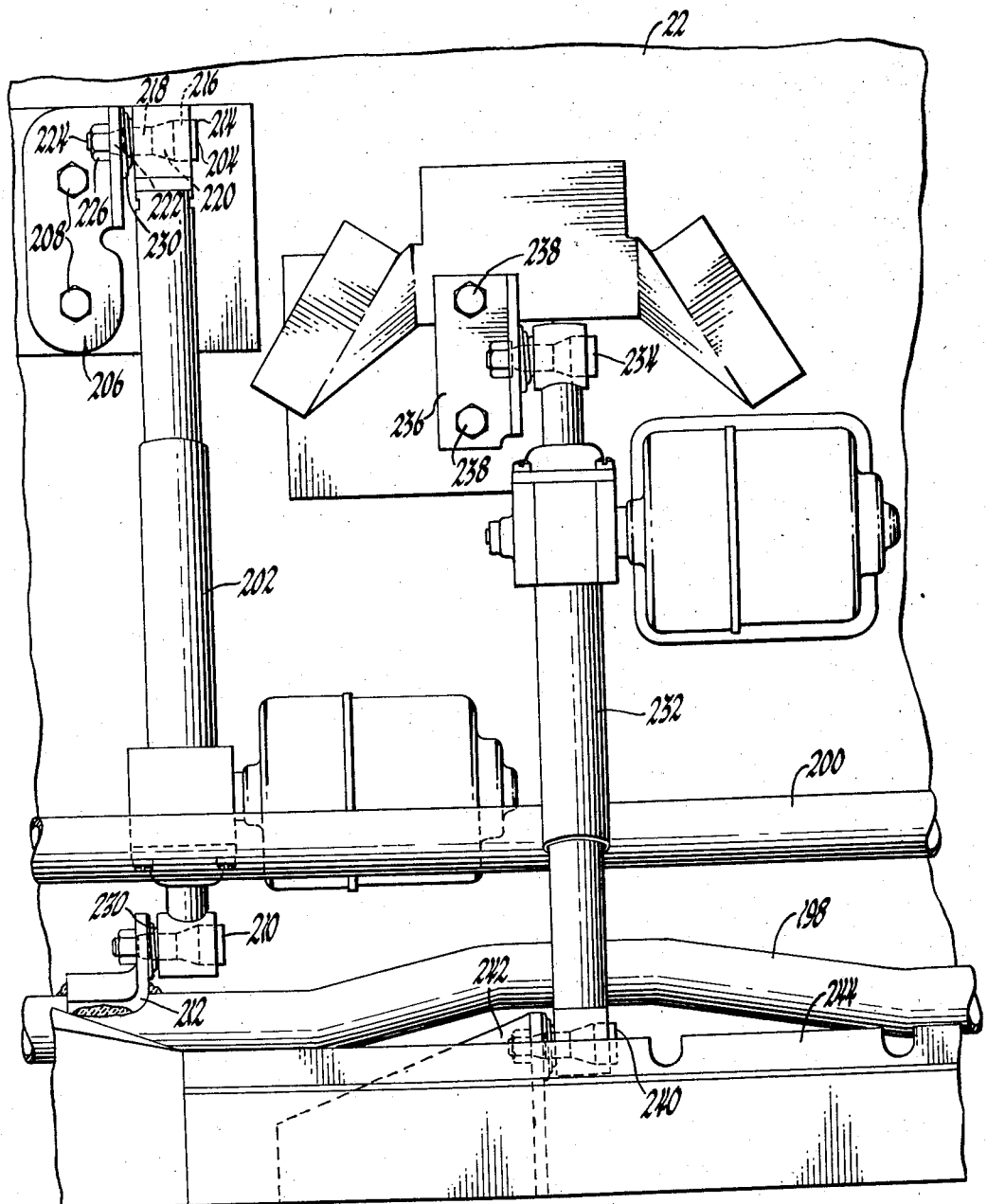

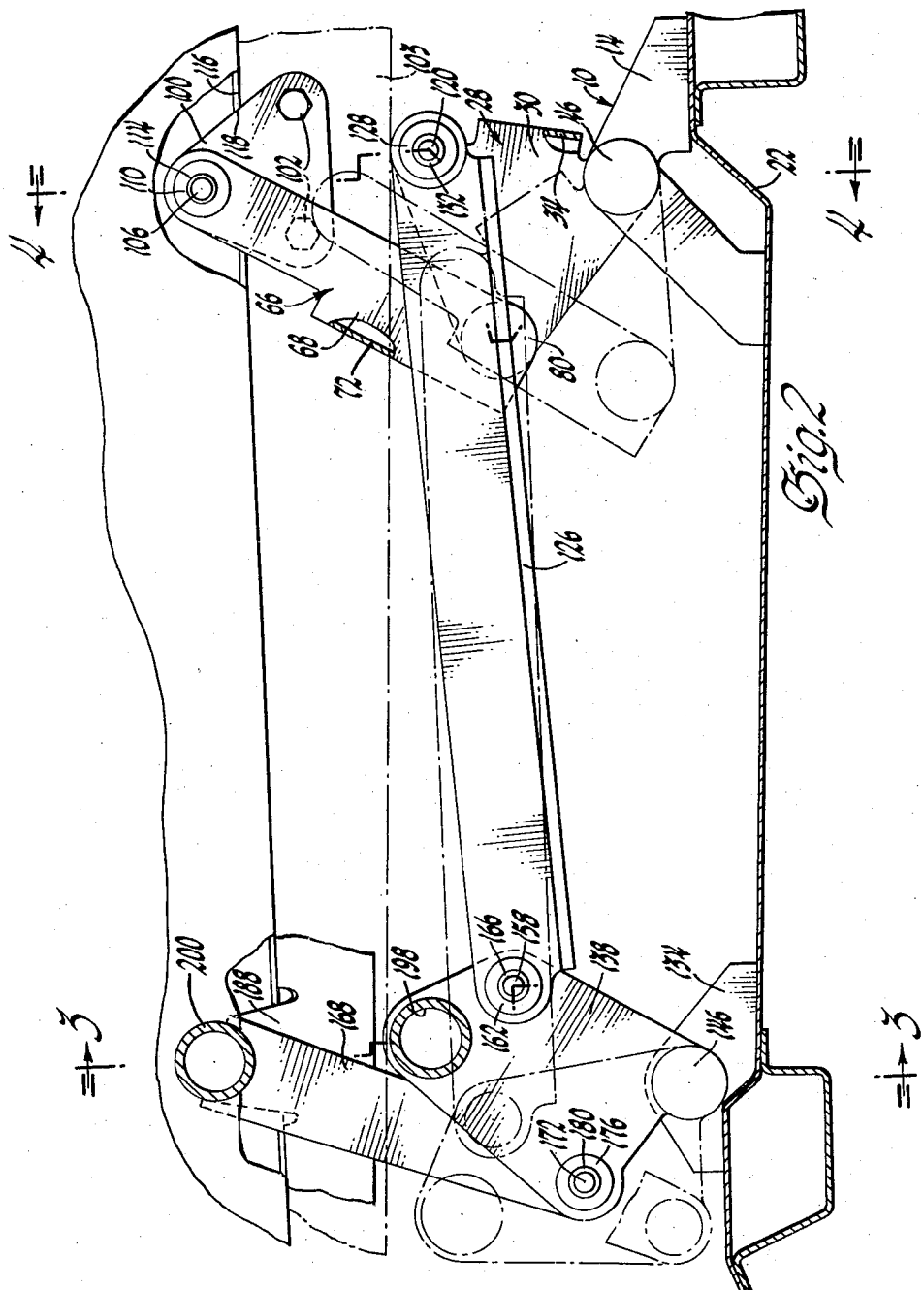

2,858,878

SEAT ADJUSTING MECHANISM

Louis P. Garvey and Claud S. Semar, Birmingham, Mich., assignors to General Motors Corporation, Detroit, Mich., a corporation of Delaware Continuation of application Serial No. 567,839, February 27, 1956. This application May 29, 1957, Serial No. 663,571

8 Claims. (Cl. 155—14)

This invention relates to seat adjusting mechanisms and more particularly to a vehicle seat adjusting mechanism which will adjust the seat in both horizontal and vertical directions. This application is a continuation of our co-pending application S. N. 567,839 filed February 27, 1956, now abandoned.

The seat adjusting mechanism of this invention is of the toggle linkage type and includes spaced pairs of pivotally interconnected upper and lower support members at each side of the seat, with the upper members of each pair being pivoted to the seat and the lower members of each pair being pivoted to a fixed support and interconnected by a shiftable link. By swinging the upper support members of both spaced pairs relative to the lower support members thereof, the seat may be adjusted in horizontal directions regardless of its vertical position and by swinging the lower support members of both spaced pairs relative to the fixed support the seat may be adjusted in vertical directions regardless of its horizontal position.

One of the particular disadvantages often found in this type of seat adjusting mechanism is rocking or instability in both horizontal and vertical directions. There is an inherent tendency for the pivots of the support members to become worn after periods of use so that the support members may shift relative to each other in any position of the seat. Thus one side of the seat may shift horizontally forwardly or rearwardly relative to the other side of the seat to cause horizontal instability or rocking, or one side of the seat may shift vertically upwardly or downwardly relative to the other side of the seat to cause vertical instability or rocking. Another disadvantage often found in this type of seat adjusting mechanism is seat side sway or shifting movement of the seat laterally of the vehicle. This also results after periods of use when the pivots of the support members have become worn. These disadvantages have often discouraged commercial usage of this type of seat adjusting mechanism since the entire seat adjusting mechanism must often be replaced when the various pivots have become worn.

This invention in its preferred embodiment, recognizes the particular disadvantages of this type of seat adjusting mechanism and provides a novel and unique manner of solving the problems of horizontal and vertical instability and seat side sway and yet provides a linkage type seat adjusting mechanism which retains the advantages of such mechanisms over other types of seat adjusting mechanisms. In addition, the linkage type seat adjusting mechanism of this invention is power operated for movement selectively and alternately in both horizontal and vertical directions.

An object of this invention is to provide a new and improved seat adjusting mechanism which will adjust a vehicle seat in both horizontal and vertical directions. Another object of this invention is to provide a new and improved seat adjusting mechanism which will selectively and alternately adjust a vehicle seat in horizontal and vertical directions. A further object of this invention is to provide a vehicle seat adjusting mechanism of the toggle linkage type which will selectively and alternately adjust the vehicle seat in horizontal and vertical directions and which reduces rocking or instability in both horizontal and vertical directions to a minimum. A more specific object of this invention is to provide a vehicle seat adjusting mechanism of the toggle linkage type which will selectively and alternately adjust a vehicle seat in horizontal and vertical directions and which includes toggle linkage structure of double construction at the rear of the seat and toggle linkage structure of single construction at the front of the seat with opposite front toggle linkage structures being interconnected by equalizer rods.

These and other objects of this invention will be readily apparent from the following specification and drawings, in which:

Figure 1 is a plan view of a portion of the seat adjusting mechanism of this invention;

Figure 2 is a side elevational view of the seat adjusting mechanism of this invention, with parts being broken away for clarity of illustration;

Figure 3 is a sectional view taken on the plane indicated by line 3—3 of Figure 2; and Figure 4 is a sectional view taken on the plane indicated by line 4—4 of Figure 2.

Before proceeding with the description of the seat adjusting mechanism it will be understood that the mechanism is the same on either side of the seat, although of different hand. Therefore, only one such adjusting mechanism will be described.

Referring now to Figures 2, 3, and 4 of the drawings, a U-shaped bracket 10 adjacent the rear of the seat includes inboard and outboard legs 14 and 16 respectively joined by webs 20 which are secured to the vehicle floor pan 22 to rigidly mount the brackets on the body. The inboard leg 14 is apertured at 24 and the outboard leg 16 is apertured at 26. A U-shaped vertical adjusting bracket 28 includes inboard and outboard legs 30 and 32 respectively joined by a web 34. The inboard leg 30 is apertured at 36, 38, and 40 and the outboard leg 32 is apertured at 42 and 44. A headed stud 46 secured within aperture 40 of the inboard leg 30 includes a tapered portion 48 received within aperture 24 of the inboard leg 14 of bracket 10. An apertured concave spring washer 50 fitting on the cylindrical terminal portion of the stud is secured in place against leg 14 of bracket 10 by a retaining ring 54. The spring washer and tapered portion 48 of stud 46 operate to take up lateral thrusts tending to separate bracket 28 from bracket 10.

A headed stud 56 secured within aperture 26 of the outboard leg 16 of bracket 10 includes a tapered portion 58 receiving aperture 44 of the outboard leg 32 of bracket 28. An apertured concave spring washer 60 fitting on the terminal cylindrical portion of stud 56 is secured in place against leg 32 of bracket 28 by a retaining ring 64. The spring washer 60 and tapered portion 58 of stud 56 operate to take up lateral thrusts tending to separate bracket 28 from bracket 10. Studs 46 and 56 thus provide a pivotal axis of swinging for bracket 28 on bracket 10 and also cooperate with spring washers 50 and 60 to take up lateral thrusts tending to separate bracket 28 from bracket 10.

A U-shaped horizontal adjusting bracket 66 includes inboard and outboard legs 68 and 70 respectively joined by a web 72. The inboard leg 68 is apertured at 72 and 74, and the outboard leg 70 is apertured at 76 and 78. A headed stud 80 secured within aperture 38 of the inboard leg 30 of bracket 28 includes a tapered portion 82 received within aperture 72 of the inboard leg 68 of bracket 66. An apertured concave spring washer 84 fitting on the terminal cylindrical portion of stud 80 is secured in place against leg 68 of bracket 66 by a retaining ring 88. The spring washer 84 and tapered portion 82 of stud 80 operate to take up lateral thrusts tending to separate the brackets.

A headed stud 90 secured within aperture 76 of the outboard leg 70 of bracket 66 includes a tapered portion 92 received within aperture 42 of the outboard leg 32 of bracket 28. An apertured concave spring washer 94 fitting on the cylindrical terminal portion of stud 90 is retained in place against leg 32 of bracket 28 by a retaining ring 98. The spring washer 94 and tapered portion 92 of stud 90 operate to take up lateral thrusts tending to separate the brackets. Studs 80 and 90 thus provide a pivotal axis of swinging for bracket 66 on bracket 28 and also cooperate with spring washers 84 and 94 to take up lateral thrusts tending to separate the brackets.

A pair of offset brackets 100 are bolted at 102 to the side walls of the seat frame channel side member 103. The upper ends of brackets 100 are apertured at 104 and headed studs 106 are secured within the apertures. Studs 106 include tapered portions 108 received within apertures 74 and 78 in the inboard and outboard legs 68 and 70, respectively, of bracket 66. An apertured concave spring washer 110 fits on the cylindrical terminal portion of each stud and is secured in place by a retaining ring 114. The spring washers 110 and tapered portions 108 of studs 106 cooperate to take up any lateral thrusts tending to separate brackets 100 from bracket 66, and studs 106 also provide a pivotal axis of swinging of brackets 100 on bracket 66. The flanges 116 of the seat frame channel side members are apertured at 118 to allow for assembly of brackets 100 and swinging movement of bracket 66 relative to brackets 100.

Brackets 28, 66, and 100 support the rear portion of each of the seat frame channel side members for both horizontal and vertical adjustment. If brackets 28 are moved clockwise about their pivotal axis of swinging defined by studs 46 and 56, brackets 66 will be shifted upwardly and will swing about their pivotal axis of swinging defined by studs 80 and 90 to raise the rear portion of the seat by means of studs 106 as brackets 66 and 100 swing relative to each other about the pivotal axis of swinging defined by studs 106. Similarly, if brackets 28 are moved counterclockwise about their pivotal axis of swinging defined by studs 46 and 56, brackets 66 will be shifted downwardly and will swing about their pivotal axis of swinging defined by studs 80 and 90 to lower the rear portion of the seat by means of studs 106 as brackets 66 and 100 swing relative to each other about the pivotal axis of swinging defined by studs 106. The latter movement of the rear portion of the seat is indicated schematically in Figure 2 by dot and dash lines.

If brackets 66 are moved clockwise about their pivotal axis of swinging defined by studs 80 and 90 and brackets 28 are held stationary, the rear portion of the seat will be moved horizontally rearwardly as brackets 100 are shifted rearwardly by means of studs 106 and brackets 66 and 100 swing relative to each other about the axis of swinging defined by studs 106. Similarly, if brackets 66 are moved counterclockwise about their pivotal axis of swinging defined by studs 80 and 90 and brackets 28 are held stationary, the rear portion of the seat will be moved horizontally forwardly as brackets 100 are shifted forwardly by means of studs 106 and brackets 66 and 100 swing relative to each other about the pivotal axis defined by studs 106. Thus, it can be seen that the rear portion of each of the seat frame channel side members is supported on the vehicle floor pan for both horizontal and vertical adjustment.

A headed stud 120 secured within aperture 36 of the inboard leg of bracket 28 includes a tapered portion 122 which receives an aperture 124 in the rear end of a shiftable link 126. An apertured concave spring washer 128 fitting on the cylindrical terminal portion of stud 120 is secured in place against link 126 by a retaining ring 132. The spring washer and tapered portion 122 of stud 120 operate to take up lateral thrusts tending to separate link 126 and bracket 28, and the stud also provides a pivotal axis of swinging of the link relative to the bracket.

An angular bracket 134 secured to the vehicle floor pan 22 adjacent the forward portion of the seat includes an aperture 136. An offset vertical adjusting plate 138 includes apertures 140, 142, and 144. A headed stud 146 is secured within aperture 140 and includes a tapered portion 148 received within aperture 136 of bracket 134. An apertured concave spring washer 150 is secured on the cylindrical terminal portion of stud 146 against bracket 134 by a retaining ring 154. The spring washer 150 and tapered portion 148 of stud 146 operate to take up lateral thrusts tending to separate plate 138 from bracket 134, and the stud also provides a pivotal axis of swinging of the plate on the bracket. A headed stud 156 secured within aperture 142 of plate 138 includes a tapered portion 158 which receives an aperture 160 in the forward end of link 126. An apertured concave spring washer 162 fitting on the cylindrical terminal portion of stud 156 is secured in place against link 126 by a retaining ring 166. The spring washer 162 and tapered portion 158 of stud 156 operate to take up lateral thrusts tending to separate the link and the plate, and the stud also provides a pivotal axis of swinging of the link relative to the plate.

An offset arm 168 is apertured at 170 at the lower end thereof, and a headed stud 172 is secured within the aperture. The stud includes a tapered portion 174 which is received within aperture 144 of plate 138. An apertured concave spring washer 176 fitting on the cylindrical terminal portion of stud 172 is secured in place against plate 138 by a retaining ring 180. The spring washer 176 and tapered portion 174 of stud 172 operate to take up lateral thrusts tending to separate arm 168 and plate 138, and the stud also provides a pivotal axis of swinging of the arm relative to the plate. The upper end of arm 168 is apertured at 182 and a headed stud 184 secured within the aperture includes a tapered portion 186. An offset bracket 188 welded or otherwise secured to the base of the forward portion of the seat frame channel side member 103 includes an aperture 190 which receives the tapered portion 186 of stud 184. An apertured concave spring washer 192 fitting on the cylindrical terminal portion of stud 184 is secured in place against bracket 188 by a retaining ring 196. The spring washer 192 and tapered portion 186 of stud 184 operate to take up lateral thrusts tending to separate bracket 188 and arm 168, and the stud also provides a pivotal axis of swinging of the arm on the bracket.

Plate 138, arm 168, and bracket 188 support the forward portion of the seat frame channel side frame members for both horizontal and vertical adjustment. If plates 138 are moved clockwise about their pivotal axis of swinging defined by studs 146, arms 168 will be shifted upwardly and will swing about their pivotal axis of swinging defined by studs 172 to raise the forward portion of the seat by means of studs 184 as brackets 188 and arms 168 swing relative to each other about the pivotal axis of swinging defined by studs 184. Similarly, if plates 138 are moved counterclockwise about their pivotal axis of swinging defined by studs 146, arms 168 will be shifted downwardly and will swing about their pivotal axis of swinging defined by studs 172 to lower the forward portion of the seat by means of studs 184 as arms 168 and brackets 188 swing relative to each other about the pivotal axis of swinging defined by studs 184. This latter movement is indicated schematically by dot and dash lines in Figure 2.

Since plates 138 and brackets 28 are interconnected by the shiftable links 126, each must swing in the same same direction. Thus, clockwise swinging of plates 138 and brackets 28 will result in the entire seat being raised, and counterclockwise swinging of the plates and brackets will result in the entire seat being lowered. Thus, both sides of the seat will be raised or lowered at the same time depending on the direction of swinging of plate 138 and brackets 28.

If arms 168 are moved clockwise about their pivotal axis of swinging defined by studs 172 and plates 138 are held stationary, the forward portion of the seat will be moved horizontally rearwardly as brackets 188 are shifted rearwardly by means of studs 184 and arms 168 and brackets 188 swing relative to each other about the axis of swinging defined by these studs. Similarly, if arms 168 are moved counterclockwise about their pivotal axis of swinging defined by studs 172 and plates 138 are held stationary, the forward portion of the seat will be moved horizontally forwardly as brackets 188 are shifted forwardly by means of studs 148 and arms 168 and brackets 188 swing relative to each other about the axis of swinging defined by these studs. Since the seat frame channel side members 103 are connected to both arms 168 and brackets 66, the entire seat will be moved horizontally forwardly or rearwardly depending on the direction of swinging of the arms and brackets. No shiftable interconnection such as link 126 is needed between the arms and brackets since the seat frame channel side members perform the function of a shiftable interconnection to provide for horizontal movement of the entire seat.

In order to ensure that both sides of the seat are raised and lowered an equal distance upon swinging movement of plates 138 and brackets 28, a vertical equalizer rod 198 spans the seat and is secured at the ends thereof to an opposite pair of plates 138. Since plates 138 are interconnected with brackets 28 by means of the shiftable links 126, no equalizer rod is needed between brackets 28. Likewise, to ensure that both sides of the seat are moved horizontally forwardly and rearwardly an equal distance, a horizontal equalizer rod 200 spans the seat and is secured at the ends thereof to the headed studs 184 on arms 168 as shown particularly in Figure 3. Since both equalizer rods are located adjacent the forward edge of the seat, additional foot room is provided for rear seat passengers.

Referring now particularly to Figure 1 of the drawings, a motor driven screw jack 202 is pivoted at 204 at one end thereof to a bracket 206 which is secured to the vehicle floor pan 22 at 208. The other end of screw jack 202 is pivoted at 210 to an angular bracket 212 which is welded or otherwise secured to the vertical torque rod 198. Pivots 204 and 210 are of the same construction and, therefore, only pivot 204 will be particularly described. Pivot 204 includes a stud 214 having cylindrical portions 216 and 218 joined by a tapered portion 220, and tapered portion 222 which terminates in a threaded portion 224. A nut 226 is threaded on portion 224 to rigidly secure stud 214 to bracket 206. The screw jack 202 is provided with an aperture of the same shape as portions 216, 218, and 222 of the stud and a conical spiral spring 230 fits between bracket 206 and the screw jack to continually urge the aperture in the screw jack into tight fitting engagement with stud 214. Thus, the stud and the conical spring washer operate to take up play between the screw jack and bracket 206 and resist lateral thrust tending to move these members toward each other.

A motor driven screw jack 232 is pivoted at 234 at one end thereof to a bracket 236 which is secured to the vehicle floor pan 22 at 238. The other end of the screw jack 232 is pivoted at 240 to an angular bracket 242 which is secured to the seat frame front channel member 244 which spans the front portion of the seat and is secured at the ends thereof to the forward ends of the seat frame side channel members 103. A seat frame rear channel member (not shown) spans the seat at the rear edge thereof and is secured to the rear ends of the seat frame channel side members to provide a rigid seat frame.

Upon extension and retraction of screw jack 202 it can be seen that the seat will be adjusted to various vertical positions as the plate members 138 and brackets 28 swing about their pivotal supports on the vehicle floor pan as previously described. Upon extension of screw jack 202, plates 138 are shifted counterclockwise about the pivotal axis of swinging defined by studs 146 and brackets 28 are moved in the same direction about the pivotal axis of swinging defined by studs 46 and 56 to lower the seat. Similarly, upon retraction of screw jack 202 the seat will be raised as plates 138 and brackets 28 swing in an opposite direction about their respective pivotal axes of swinging.

Screw jack 232 operates directly against the seat frame rather than operating against the horizontal torque rod 200. Upon extension of screw jack 232 the entire seat frame will be moved horizontally forwardly as arms 168 swing about their pivotal axis of swinging defined by studs 172 and brackets 66 swing about their pivotal axis of swinging defined by studs 80 and 90 as previously described. Similarly, upon retraction of screw jack 232 the seat will be moved horizontally rearwardly as arms 168 and brackets 66 swing in an opposite direction about their respective pivotal axes of swinging.

It will be noted that the seat may be adjusted vertically regardless of the horizontal position of the seat and likewise that the seat may be adjusted horizontally regardless of the vertical position of the seat. When the seat has been moved to the desired vertical position screw jack 202 operates as a fixed link pivotally interconnecting the vehicle floor pan and the vertical torque rod 198 to prevent any movement of the vertical torque rod and plates 138 about the pivotal axis of swinging defined by studs 146. Thus, the seat will be securely held in any vertical position but may be adjusted horizontally regardless of this position since arms 168 and brackets 66 may swing relative to plates 138 and brackets 28.

When the seat has been moved to a horizontally adjusted position screw jack 232 operates in the same manner as screw jack 202 to function as a fixed link interconnecting the vehicle floor pan and the seat frame. Thus, the seat is rigidly held in any horizontally adjusted position although it may be adjusted vertically in any such position by swinging movement of plates 138 and bracket 28 as previously described. Screw jack 232 is pivoted to both the seat and the floor pan and thus will allow swinging movement of the seat frame about an axis defined by pivot 234 to allow vertical adjustment of the seat upon actuation of screw jack 202.

Since most of the weight of the occupant is centered at the rear of the seat frame, brackets 28 and 66 are of double construction although they function as a single toggle linkage. By providing such a double construction together with the lateral take up feature of the pairs of aligned spaced studs at each side of the seat which define the various pivotal axes of swinging of the rear support members, horizontal and vertical rocking or instability and seat side sway are reduced to a minimum. Each pair of aligned spaced studs, such as studs 46, 56; 80, 90; 106; have their tapered portions extending oppositely with respect to each other to insure that the studs and spring washers will act to resist any displacement of the support members relatively to each other once the seat has been adjusted to any horizontal or vertical position. The forward support members for the seat also function as a toggle linkage but are of single construction rather than double construction. The single pivots on each side of the seat at the front portion thereof also have their tapered portions extending oppositely with respect to each other to further insure adequate and effective take up. The horizontal and vertical equalizer rods which span the seat adjacent the front edge thereof impart further rigidity to the seat and support members and also cooperate with the lateral take up features of the studs of these support members to prevent displacement of the support members relative to each other.

Thus, this invention provides a seat adjusting mechanism which will impart both horizontal and vertical movement to a vehicle seat and which includes a minimum number of parts for ease of assembly and maintenance. The seat adjusting mechanism includes a number of pivotally interconnected front and rear support members and the pivots which interconnect these support members include a lateral take up feature to reduce horizontal and vertical rocking or instability to a minimum and provide a substantially stationary seat support in any adjusted position of the seat. The horizontal and vertical equalizer rods adjacent the front edge of the seat also aid the pivots of the front support members in providing a stationary seat support.

While a specific embodiment of this invention has been shown and described, various changes and modifications may be made within the scope and spirit of this invention.

We claim:

1. In combination with a vehicle seat, a seat adjusting mechanism comprising, a fixed support, toggle linkage means extending between said support and said seat adjacent each side thereof, said linkage means including lower link means pivotally mounted on said fixed support and upper link means pivotally secured to said seat, first means operable to move said toggle link means relative to said support to move said seat to vertical adjusted positions, second means operable to move said upper link means relative to said lower link means to move said seat to horizontal adjusted positions, and lateral thrust take up means at the pivots of each of said link means.

2. In combination with a vehicle seat, a seat adjusting mechanism comprising, a fixed support, toggle linkage means extending between said support and said seat adjacent each side thereof, said linkage means including lower link means pivotally mounted on said fixed support and upper link means pivotally secured to said seat, drive means connecting opposite pairs of upper links for conjoint rotation thereof relative to said lower links to move said seat to horizontal adjusted positions, means operable to move said toggle linkage means relative to said fixed support to move said seat to vertical adjusted positions, and lateral thrust take up means at the pivots of each of said link means.

3. In combination with a vehicle seat, a seat adjusting mechanism comprising, a fixed support, toggle linkage means extending between said support and said seat adjacent each side thereof, said linkage means including lower link means pivotally mounted on said fixed support and upper link means pivotally secured to said seat, first drive means connecting opposite pairs of upper links for conjoint rotation thereof relative to said lower links to move said seat to horizontal adjusted positions, second drive means connecting opposite pairs of lower links for conjoint rotation thereof relative to said fixed support to move said seat to vertical adjusted positions, and lateral thrust take up means at the pivots of each of said link means.

4. In combination with a vehicle seat, a seat adjusting mechanism comprising, a fixed support, spaced toggle linkage means extending between said support and said seat adjacent each side thereof, said linkage means including lower link means pivotally mounted on said fixed support and upper link means pivotally secured to said seat, first drive means connecting the upper links of opposite toggle linkage means at each side of said seat for conjoint rotation thereof relative to said lower links to move said seat to horizontal adjusted positions, second drive means connecting the lower links of said opposite toggle linkage means for conjoint rotation thereof relative to said support to move said seat to vertical adjusted positions, means interconnecting said lower link means of each of said spaced toggle linkage means for conjoint rotation of said lower link means at each side of said seat, and lateral thrust take up means at the pivots of each of said link means.

5. In combination with a vehicle seat, a seat adjusting mechanism comprising, a fixed support, toggle linkage means extending between said support and said seat adjacent each side thereof, said linkage means including lower link means pivotally mounted on said fixed support and upper link means pivotally secured to said seat, first means operable to move said toggle link means relative to said support to move said seat to vertical adjusted positions, and second means operable to move said upper link means relative to said lower link means to move said seat to horizontal adjusted positions.

6. In combination with a vehicle seat, a seat adjusting mechanism comprising, a fixed support, toggle linkage means extending between said support and said seat adjacent each side thereof, said linkage means including lower link means pivotally mounted on said fixed support and upper link means pivotally secured to said seat, drive means connecting opposite pairs of upper links for conjoint rotation thereof relative to said lower links to move said seat to horizontal adjusted positions, and means operable to move said toggle linkage means relative to said fixed support to move said seat to vertical adjusted positions.

7. In combination with a vehicle seat, a seat adjusting mechanism comprising, a fixed support, toggle linkage means extending between said support and said seat adjacent each side thereof, said linkage means including lower link means pivotally mounted on said fixed support and upper link means pivotally secured to said seat, first drive means connecting opposite pairs of upper links for conjoint rotation thereof relative to said lower links to move said seat to horizontal adjusted positions, and second drive means connecting opposite pairs of lower links for conjoint rotation thereof relative to said fixed support to move said seat to vertical adjusted positions.

8. In combination with a vehicle seat, a seat adjusting mechanism comprising, a fixed support, spaced toggle linkage means extending between said support and said seat adjacent each side thereof, said linkage means including lower link means pivotally mounted on said first support and upper link means pivotally secured to said seat, first drive means connecting the upper links of opposite toggle linkage means at each side of said seat for conjoint rotation thereof relative to said lower links to move said seat to horizontal adjusted positions, second drive means connecting the lower links of said opposite toggle linkage means for conjoint rotation thereof relative to said support to move said seat to vertical adjusted positions, and means interconnecting said lower link means of each of said spaced toggle linkage means for conjoint rotation of said lower link means at each side of said seat.

References Cited in the file of this patent

UNITED STATES PATENTS

| 2,161,366 | McGregor | June 6, 1939 |
| 2,260,032 | Kaiser et al. | Oct. 21, 1941 |
| 2,555,804 | McCarthy | June 5, 1951 |

FOREIGN PATENTS

| 551,808 | Great Britain | Mar. 10, 1943 |